Nov. 14, 1933.  A. W. READER  1,934,883
LUBRICATING APPARATUS
Filed Sept. 9, 1929  2 Sheets-Sheet 1
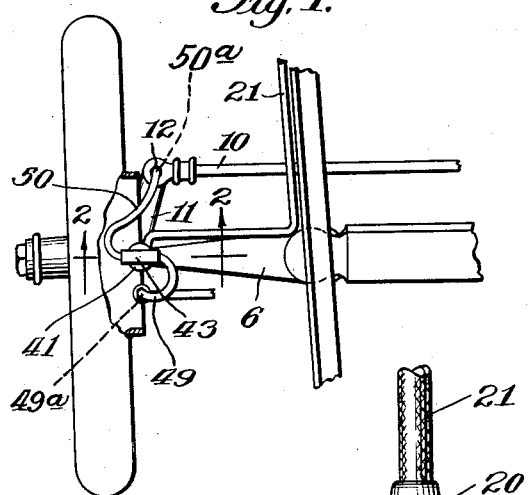
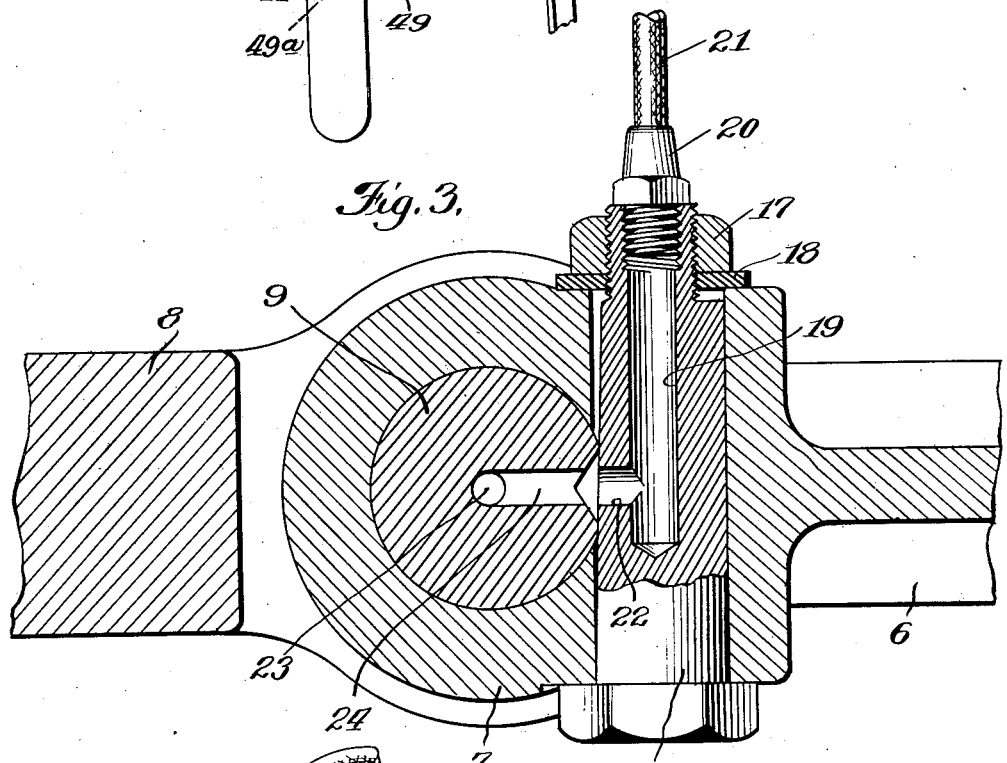
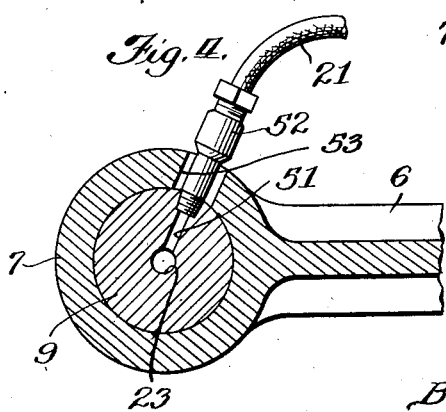
Inventor
Allan Warren Reader
By Williams, Bradbury, McCabe & Hinkle
Attys.

Nov. 14, 1933.  A. W. READER  1,934,883

LUBRICATING APPARATUS

Filed Sept. 9, 1929  2 Sheets-Sheet 2

Inventor
Allan Warren Reader
By Williams, Bradbury, McCaleb & Hinkle
Attys.

Patented Nov. 14, 1933

1,934,883

UNITED STATES PATENT OFFICE 1,934,883

LUBRICATING APPARATUS

Allan Warren Reader, Ferndale, Mich., assignor to Alemite Corporation, Chicago, Ill., a corporation of Delaware Application September 9, 1929. Serial No. 391,119

11 Claims. (Cl. 184—7)

My invention relates to centralized systems of chassis lubrication and has for its main object an improved and simplified arrangement for supplying lubricant to the king-pin, tie rod bolts and front wheel braking mechanism of an automobile.

An object of my invention is to provide a conduit arrangement wherein lubricant is supplied to the king-pin through the key bolt which secures the king-pin in position.

Another object of my invention is to provide an improved and simplified conduit arrangement for supplying lubricant to the king-pin and front wheel spindle assembly, including the wheel brake and tie rod pivot.

Still another object of my invention is to provide an improved conduit system for supplying lubricant to the king-pin and associated mechanism by supplying the lubricant directly to the king-pin itself.

Further objects and advantages of my invention will become more apparent through the following detailed description and accompanying drawings, in which Fig. 1 is a plan view of a fragment of the front end portion of an automobile chassis;

Fig. 3 is a horizontal cross sectional view taken on the line 3—3 of Fig. 2; and Fig. 4 is a horizontal cross sectional view illustrating another form of adaptation of my invention.

Figure 2:
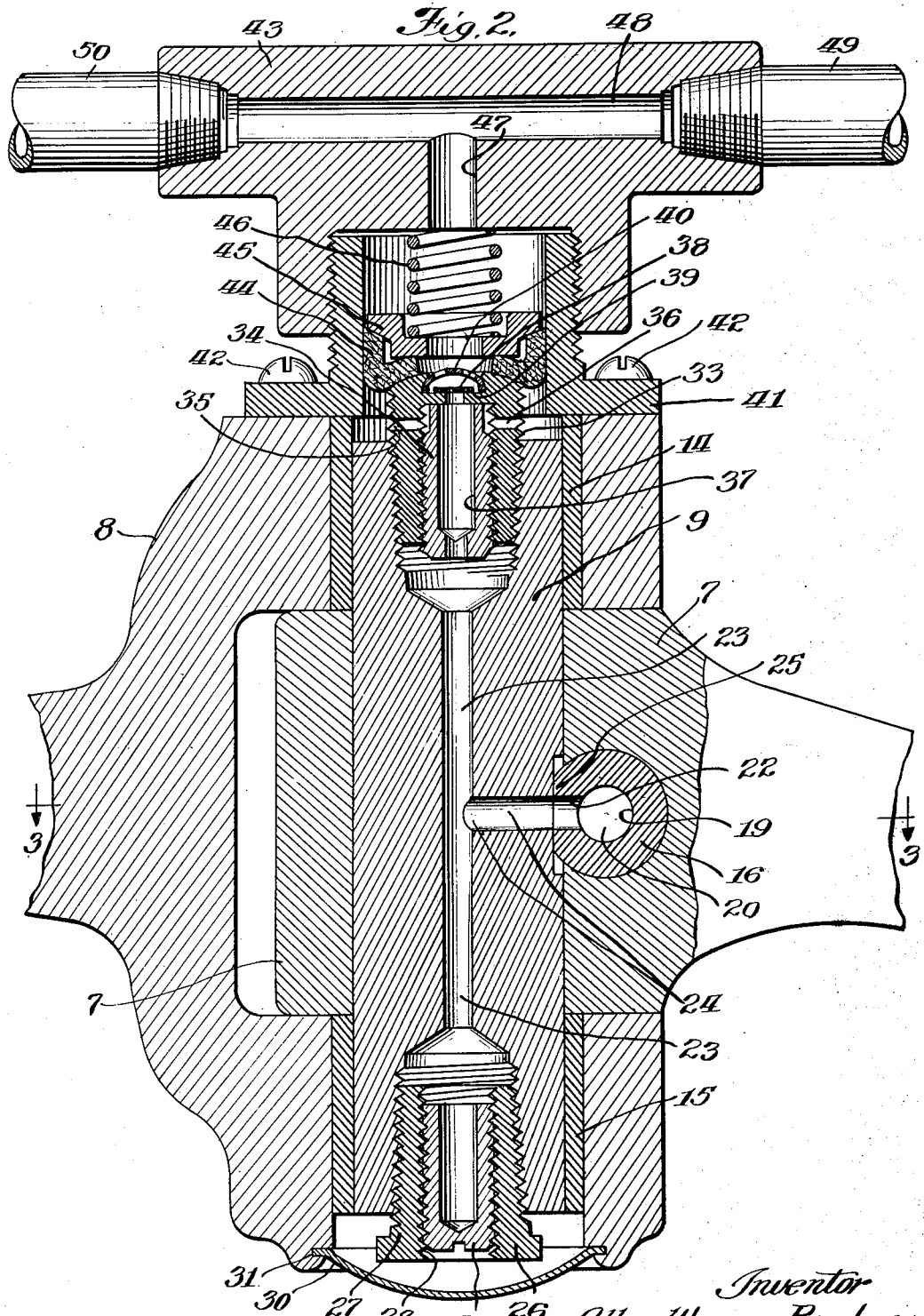
Fig. 2 is an enlarged vertical cross sectional view of my improved swiveled conduit connection.

Referring to the drawings in which like reference characters designate like parts throughout the several views, there is shown a front axle 6 having a spindle body 7 at its end and a front wheel spindle fork 8 which carries and supports the wheel of the automobile. A king-pin 9 extends through the spindle body 7 and spindle fork 8 forming a pivot for the spindle.

A tie rod 10 is pivotally connected to the spindle arm 11 by means of a bolt 12 as shown in Fig. 1. The king-pin 9 rotates in bearings 14 and 15 located in the upper and lower ends of the spindle fork 8 and is keyed in the spindle body 7 in the end of the axle 6 by means of a tapered key bolt 16 which is headed at one end and threaded at the othed to receive a nut 17 and washer 18 for securing it in place.

The key bolt 16 has a longitudinally extending central bore 19 which is threaded at one end to receive a coupling 20 for connecting the oil pipe supply line 21 to the end of the key bolt forming a sealed connection so that lubricant may flow from the supply line 21 into the bore 19 of the key bolt.

A short passageway 22 communicates with the bore 19 to allow lubricant to flow outwardly from the key bolt. The king-pin has a central bore 23 which is connected to the passageway 22 by drilled hole 24 approximately at the center of the king-pin.

The lower end of the bore 23 is enlarged and screw threaded to receive a resistance unit fitting 26 which comprises a body member 27 having a screw threaded central bore 28 adapted to receive a screw flow resistance plug 29 having flattened threads. Since the threads cut in the bore of body 27 are V-shaped in cross section, a long, small, helical groove is formed between the body and the plug. This groove forms a passageway offering high resistance to the flow of lubricant.

A metal cap 30 is secured in a groove 31 in the lower end of the spindle fork 8.

A similar resistance unit fitting 33 is screw threaded in the upper end of the king-pin 9 and has a central flow resistance plug 34 screw threaded therein to regulate the flow of lubricant to the upper bearing 14. The lubricant flows through the long spiral groove formed between the internal threads of the resistance unit body and the threads of the flow resistance plug 34 and thence through bores 35 and 36 to the bearing 14. The plug 34 also has a central bore 37 extending longitudinally therethrough.

A floating valve disc 38 made of oiled silk or other suitable material is seated on a shoulder 39 formed within the upper end of the fitting 33 An apertured metal cage 40 is placed over the valve 38. The upper part of the body of the resistance unit fitting 33 is crimped over the metal cage to hold it in place. The cage thus limits vertical and lateral movement of the valve disc and maintains it adjacent its seat at all times. The valve 38 acts as an extremely sensitive check valve and will thus prevent reverse flow of oil and the admission of air into the king-pin bore.

A cylindrical flanged nipple 41 is mounted on the upper end of the spindle fork 8 by means of screws 42. The nipple 41 is screw threaded on its outer surface the receive a T-shaped head 43.

A centrally apertured leather cup washer 44 having its flange engaging the smooth cylindrical bore in the nipple 41, is seated on the upper end of the resistance unit body 33 and is held snugly in place by means of a centrally apertured metal hat-shaped washer 45 which is pressed against the cup leather by a compression spring 46 which is confined between this washer and the T-shaped head 43. The head has a vertical bore 47 which is in alignment with the bore 23 in the center of the king-pin 9. This bore 47 communicates with a horizontal bore 48 which is screw threaded at both ends to receive lubricant conduits 49 and 50 which conduct lubricant to the tie rod bolts and braking mechanism, respectively.

Lubricant under pressure is supplied to the conduit 21 from some central source (not shown in the drawings) and flows through the bore 19 in the key bolt 16, through the shorter bore 22 therein, and through the hole 24 into the central bore 23 of the king-pin. Part of this lubricant flows downwardly through the measuring valve 26 to lubricate the lower bearing 15. A larger part of the lubricant flows upwardly through the flow resistance plug 34 of the upper measuring valve 33 and thence through apertures 35 and 36 to lubricate the upper bearing 14 of the spindle. Lubricant also flows upwardly through the central bore 37 of the plug 34, past the valve 38 and through the bore 47 of the swivel head into the conduits 49 and 50, respectively, to lubricate the tie rod bolts and braking mechanism. The connection of the conduits 49 and 50 with their respective bearings preferably includes resistance unit fittings 49a and 50a which may be of any conventional construction. It will be understood that the resistance to flow of lubricant through the resistance unit fittings 26, 33, 49a and 50a may be made to differ so that the lubricant will be properly proportioned between the different bearings in accordance with their respective lubricant requirements.

When the spindle fork is moved pivotally about the king-pin the cup leather washer 44 will maintain a lubricant-tight seal between the flanged nipple 41 and the end of the resistance unit fitting 33. Thus the conduits 49 and 50, which lead to bearings which revolve about the king-pin 9, may be rigid and rigidly secured to their respective bearings.

In Fig. 4, I have illustrated a modified form of my invention showing the front axle 6 and spindle 7 carrying the king-pin 9 with its central aperture 23, but in this form of my invention I supply the lubricant directly to the central aperture 23 by means of a communicating bore 51 which is enlarged and screw threaded at its end to receive a suitable fitting plug 52 which is connected with the supply conduit 21 to conduct lubricant to the central bore 23 of the king-pin, and which passes through a suitable hole 53 formed in the axle.

The invention is capable of wide variation within equivalent limits and I contemplate such variation as may be desirable or useful in the particular adaptation of the invention shown, or in its adaptation to other apparatus. I do not restrict myself in any unessential particulars, but what I claim and desire to secure by Letters Patent is:

1. In apparatus for supplying lubricant to the steering knuckle and associated bearings of an automotive vehicle, the combination of an axle, a yoked spindle, a king-pin pivotally connecting said spindle and axle, said king-pin having a longitudinal passageway therein, means for supplying lubricant under pressure to said longitudinal passageway, a lubricant flow resistance fitting secured in one end of said passageway, a conduit member rigidly secured to said spindle adjacent said end of said king-pin passageway, said member having a bore in axial alignment with said king-pin, and a spring pressed gasket engaging the end of said flow resistance fitting and the walls of the bore in said member.

2. In apparatus for supplying lubricant to the steering knuckle and associated bearings of an automotive vehicle, the combination of an axle, a steering knuckle, a king-pin pivotally connecting said steering knuckle and axle and having two bearing surfaces, said king-pin having an axial passageway therein, means for supplying lubricant under pressure to said axial passageway, a lubricant flow resistance fitting secured in the upper end of said passageway, a branched conduit member rigidly secured to said steering knuckle adjacent the upper end of said king-pin, said member having a bore in axial alignment with said king-pin, and a gasket forming a seal between said flow resistance fitting and said member.

3. A lubricant distributing and conducting fitting comprising a body adapted to be secured in a lubricant passageway, said body having an internal longitudinal bore, a tubular plug fitting in said bore and defining a restricted passageway between the bore of the body and the plug, and a laterally extending duct in said body communicating with said restricted passageway.

4. A lubricant distributing and conducting device comprising a body adapted to be secured in a lubricant passageway, said body having an internally threaded bore, an axially bored plug screwed into said bore, the threads on said plug and in said body being of different shape thereby defining a restricted passageway between the body and the plug, and an outlet duct in said body communicating with said restricted passageway.

5. In a lubricant distributing system, the combination of a shaft and a relatively moving bearing therefor, a passageway in said shaft connected to a supply of lubricant under pressure, a bored fitting at one end of said passageway, a plug held within the bore of said fitting, said plug defining a restricted passageway for the flow of lubricant between the bore of said fitting and the external surface of said plug and having a passageway extending therethrough, ducts leading from said restricted passageway to conduct lubricant to the bearing surfaces of said shaft, a cylindrically bored member secured to said bearing, a cup leather having its face engaging the end of said fitting and its cylindrical surfaces the walls of the bore in said member, resilient means for holding said cup leather in position, and conduit means connected to said member for conducting lubricant to bearings stationary relative to said first-named bearing.

6. In a lubricant distributing system, the combination of a shaft and a relatively moving bearing therefor, a passageway in said shaft connected to a supply of lubricant under pressure, a bored fitting at one end of said passageway, a plug secured within the bore of said fitting, said plug and fitting defining a restricted passageway for the flow of lubricant, said plug having a passageway extending therethrough, a duct leading from said restricted passageway to conduct lubricant to the bearing surfaces of said shaft, a cylindrical bore adjacent said bearing, a cup leather having its face engaging the end of said fitting and its cylindrical surfaces the walls of said bore, and conduit means connected to said member for conducting lubricant to bearings stationary relative to said first-named bearing.

7. In a centralized lubricating system for automotive vehicles, the combination of a front axle, a yoked spindle, a king-pin pivotally connecting said axle and yoked spindle, a bolt for holding said king-pin rigid in said axle, a longitudinal lubricant conducting passageway in said king-pin, means for supplying lubricant to said passageway, said means being stationary relative to said axle, a lubricant flow resistance fitting secured in each end of said passageway for apportioning the lubricant between the bearings of said king-pin, a swivel member secured to said yoked spindle in axial alignment with said passageway, means for forming a seal between said swivel member and the fitting adjacent thereto, a relatively free lubricant conducting passageway extending through said last-named fitting, check valve means in said fitting, and conduit means connected to said swivel member for supplying lubricant to bearings movable with said yoked spindle.

8. In a centralized lubricating system for automotive vehicles, the combination of a front axle, a steering knuckle, a king-pin pivotally connecting said axle and steering knuckle, means for holding said king-pin rigid with one of said members, a lubricant conducting passageway extending longitudinally in said king-pin, means for supplying lubricant to said passageway, said means being stationary relative to said axle, a lubricant flow resistance fitting secured in each end of said passageway for apportioning the lubricant between the bearings of said king-pin, a swivel member secured to one of said members in axial alignment with said passageway, means for forming a seal between said swivel member and the fitting adjacent thereto, a relatively free lubricant conducting passageway extending through said last-named fitting, and conduit means connected to said swivel member for supplying lubricant to bearings movable with said swivel member.

9. In apparatus for supplying lubricant to the steering knuckle and associated bearings of an automotive vehicle, the combination of an axle, a yoked spindle, a king-pin pivotally connecting said spindle and axle, said king-pin having a longitudinal passageway therein, means for supplying lubricant under pressure to said longitudinal passageway, a lubricant flow resistance fitting secured in one end of said passageway, a non-return valve therein, a conduit member rigidly secured to said spindle adjacent said end of said king-pin passageway, said member having a bore in axial alignment wtih said king-pin, and a spring pressed gasket engaging the end of said flow resistance fitting and the walls of the bore in said member.

10. In apparatus for supplying lubricant to the steering knuckle and associated bearings of an automotive vehicle, the combination of an axle, a steering knuckle, a king-pin pivotally connecting said steering knuckle axle and having two bearing surfaces, said king-pin having an axial passageway therein, means for supplying lubricant under pressure to said axial passageway, a lubricant flow resistance unit secured in both the upper and the lower ends of said passageway for allowing a limited flow of lubricant to pass to said steering knuckle and axle bearings, said upper flow resistance unit having an axial bore therethrough, a non-return valve covering said bore, a branched conduit member rigidly secured to said steering knuckle adjacent the upper end of said king-pin, said member having a bore in axial alignment wtih said king-pin, and a gasket forming a seal between said flow resistance fitting and said member.

11. In apparatus for supplying lubricant to the steering knuckle and associated bearings of an automotive vehicle, the combination of an axle, a steering knuckle, a king-pin pivotally connecting said steering knuckle axle and having two bearing surfaces, said king-pin having an axial passageway therein, means for supplying lubricant under pressure to said axial passageway, a lubricant flow resistance unit secured in both the upper and the lower ends of said passageway for allowing a limited flow of lubricant to pass to said steering knuckle and axle bearings, said upper flow resistance unit having an axial bore therethrough, a branched conduit member rigidly secured to said steering knuckle adjacent the upper end of said king-pin, said member having a bore in axial alignment with said king-pin, and a gasket forming a seal between said flow resistance fitting and said member.

ALLAN WARREN READER.